(12) United States Patent
Job

(10) Patent No.: US 9,428,029 B2
(45) Date of Patent: Aug. 30, 2016

(54) AIR SPRING MODULE

(71) Applicant: Continental Teves AG & Co. oHG, Frankfurt (DE)

(72) Inventor: Heinz Job, Neustadt (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/422,065

(22) PCT Filed: Jul. 3, 2013

(86) PCT No.: PCT/EP2013/064025
§ 371 (c)(1),
(2) Date: Feb. 17, 2015

(87) PCT Pub. No.: WO2014/029543
PCT Pub. Date: Feb. 27, 2014

(65) Prior Publication Data
US 2015/0210138 A1    Jul. 30, 2015

(30) Foreign Application Priority Data

Aug. 21, 2012  (DE) ......... 10 2012 016 397
Sep. 27, 2012  (DE) ......... 10 2012 217 538

(51) Int. Cl.
*B60G 17/04*    (2006.01)
*B60G 15/14*    (2006.01)
(Continued)

(52) U.S. Cl.
CPC .......... *B60G 17/0432* (2013.01); *B60G 15/12* (2013.01); *B60G 15/14* (2013.01);
(Continued)

(58) Field of Classification Search
CPC ............... B60G 17/0432; B60G 17/0521; B60G 17/0523; B60G 15/12; B60G 15/14; F16F 9/049
See application file for complete search history.

(56) References Cited

U.S. PATENT DOCUMENTS 4,762,308 A    8/1988    Geno
5,255,935 A   10/1993    Imani
(Continued)

FOREIGN PATENT DOCUMENTS

CN    102287469    12/2011
DE     19911620     9/2000
(Continued)

OTHER PUBLICATIONS

German Search Report mailed Mar. 12, 2014 for German Application No. 10 2013 212 974.2, including partial translation.
(Continued)

*Primary Examiner* — Vishal Sahni
(74) *Attorney, Agent, or Firm* — RatnerPrestia

(57) ABSTRACT

An air spring module including an air spring and a shock absorber for springing and damping vibrations of a motor vehicle chassis, including—at least two working chambers filled with compressed air and connectable via at least one valve, an air spring cover, a rolling bellows fixed to the air spring cover in an air-tight manner and at least partly delimits a first working chamber filled with compressed air, and a rolling piston, which is fixed to a cylindrical tube of the shock absorber and on which the rolling bellows rolls. A second and a third working chamber are arranged one above the other in the rolling piston so as to surround the cylindrical tube. The working chambers are separated from each other by an intermediate floor provided in the rolling piston and can be connected to the first working chamber via switchable valves arranged in the rolling piston.

12 Claims, 8 Drawing Sheets

(51) Int. Cl.
*B60G 17/052* (2006.01)
*F16F 9/04* (2006.01)
*B60G 15/12* (2006.01)

(52) U.S. Cl.
CPC ....... *B60G17/0521* (2013.01); *B60G 17/0523* (2013.01); *F16F 9/049* (2013.01); *B60G 2202/152* (2013.01); *B60G 2202/314* (2013.01); *B60G 2204/1262* (2013.01); *B60G 2500/2041* (2013.01)

(56) References Cited

U.S. PATENT DOCUMENTS

| | | | | |
|---|---|---|---|---|
| 5,669,597 | A | * | 9/1997 | Rittstieg ............... B60G 17/044 267/64.17 |
| 6,910,682 | B2 | * | 6/2005 | Fritz ...................... B60G 15/12 267/35 |

| | | | |
|---|---|---|---|
| 2003/0127781 | A1 | 7/2003 | Fritz |
| 2007/0023981 | A1 | 2/2007 | Helmling |
| 2008/0246198 | A1 | 10/2008 | Levy |
| 2008/0290571 | A1 * | 11/2008 | Krauss .................. F16F 9/0472 267/124 |

FOREIGN PATENT DOCUMENTS

| | | |
|---|---|---|
| DE | 10200632 | 7/2003 |
| DE | 102004012881 | 10/2005 |
| EP | 0284736 | 10/1988 |
| WO | 2012100003 | 7/2012 |

OTHER PUBLICATIONS

International Search Report for International Application No. PCT/EP2013/064025 mailed Oct. 29, 2013.

* cited by examiner

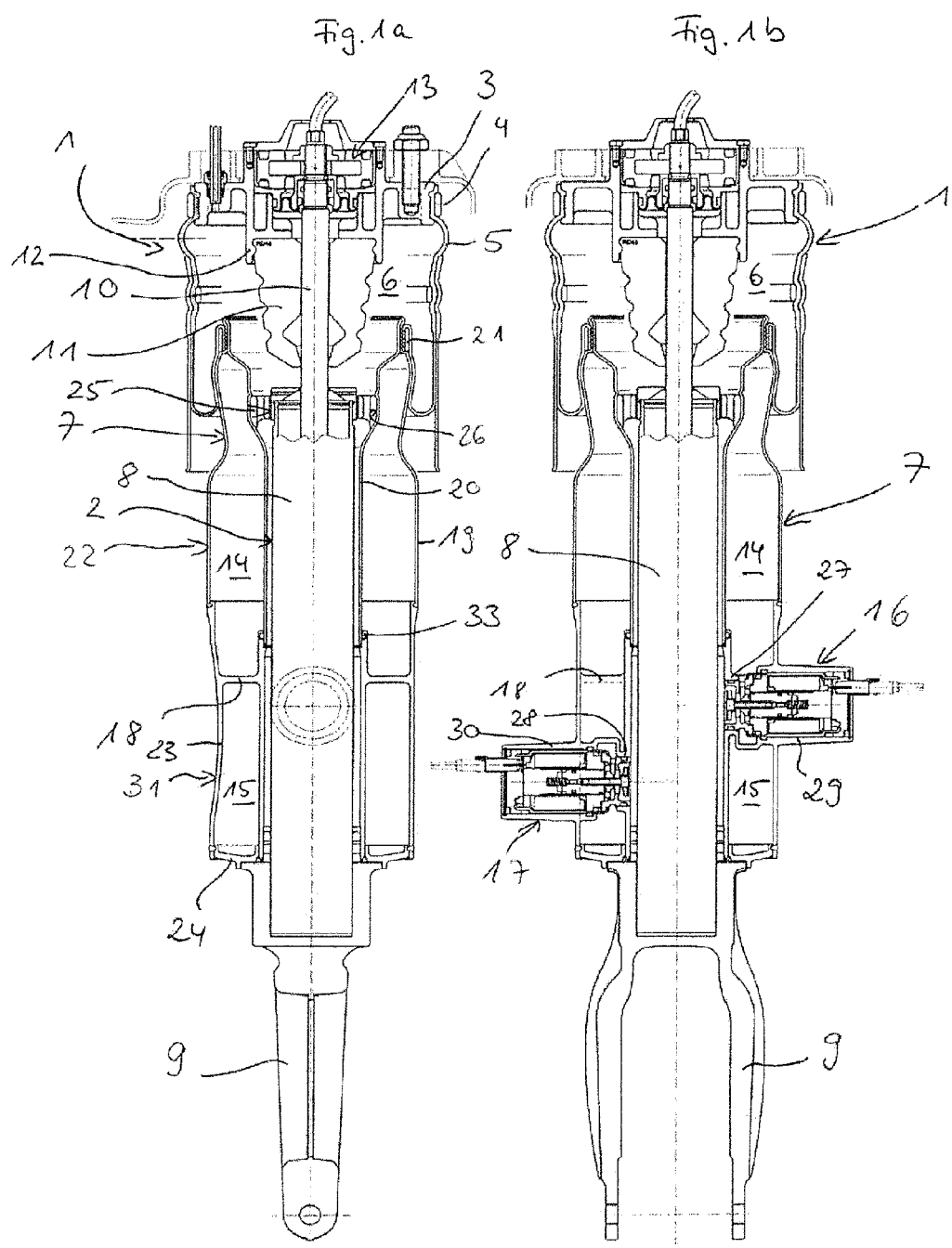

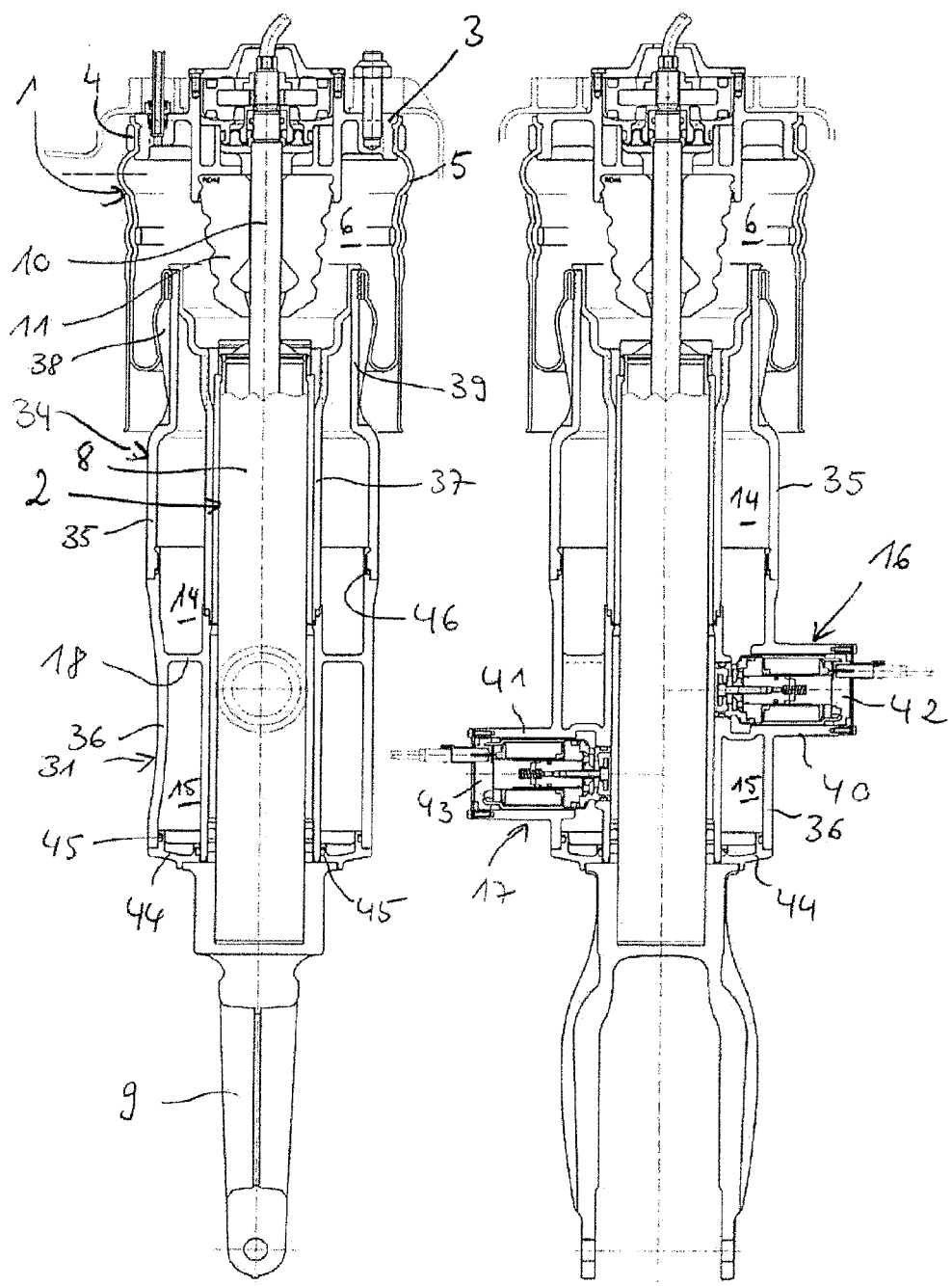

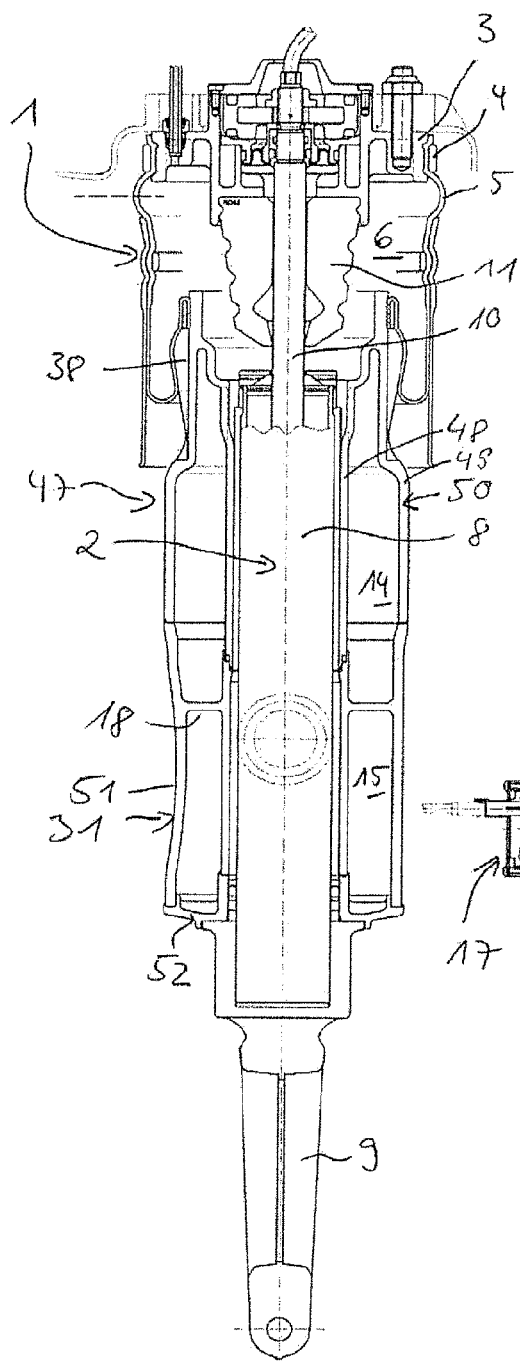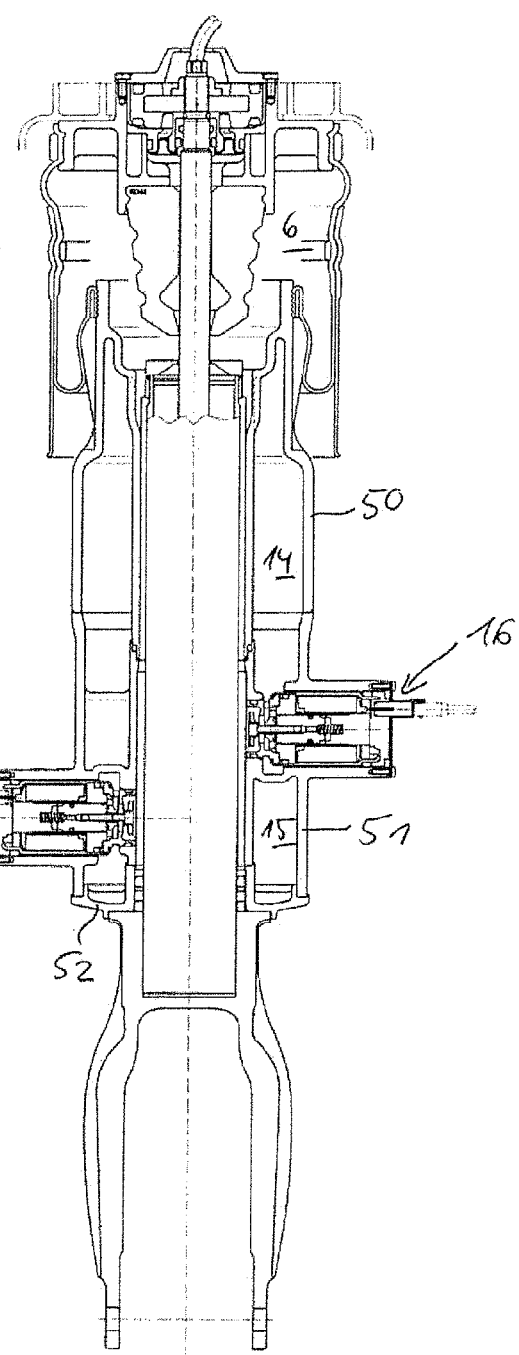

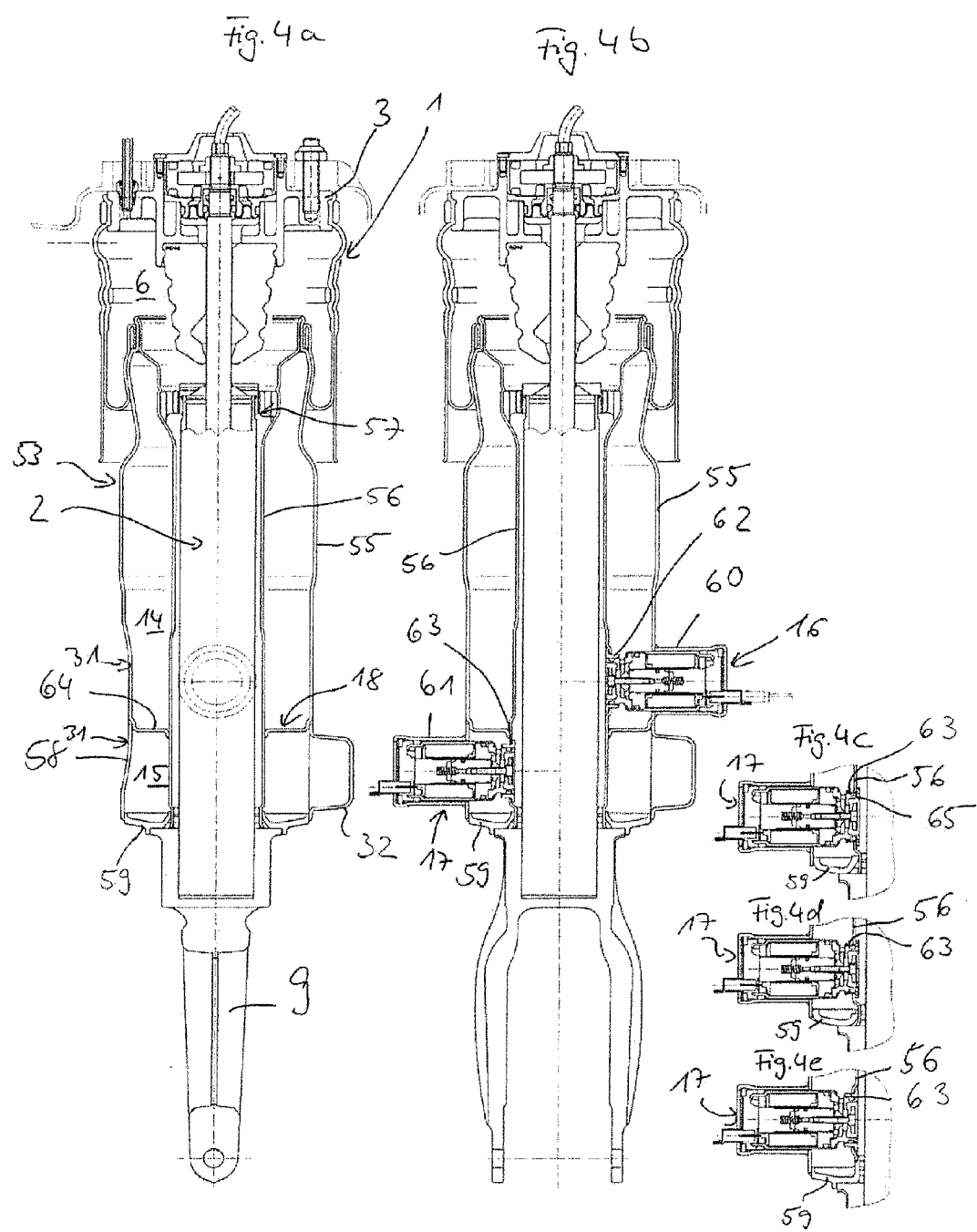

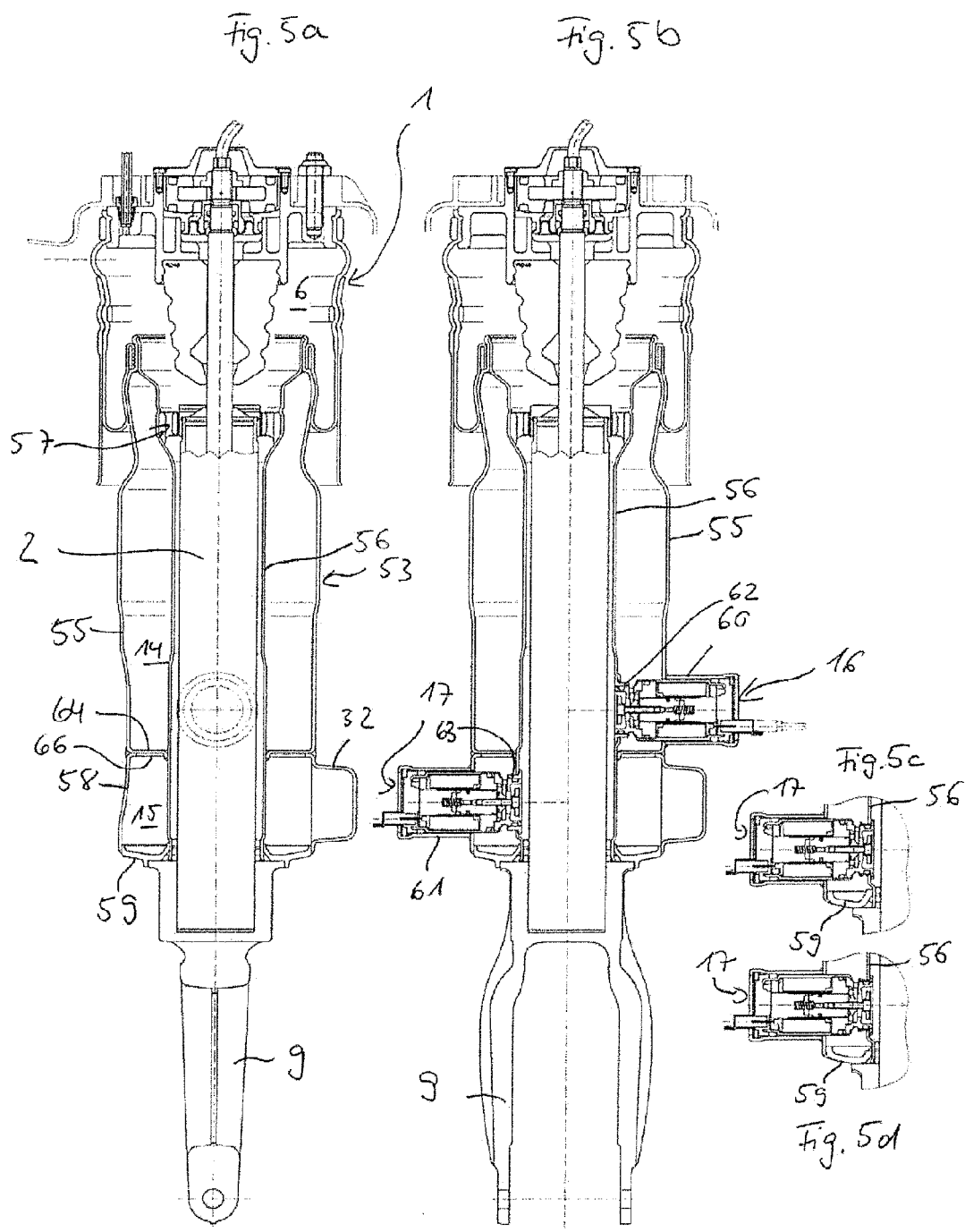

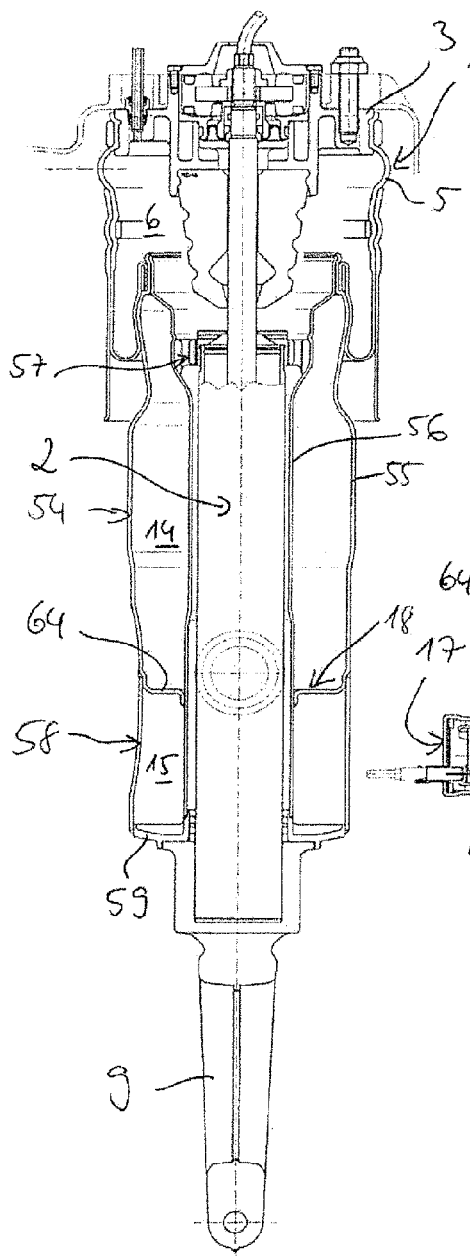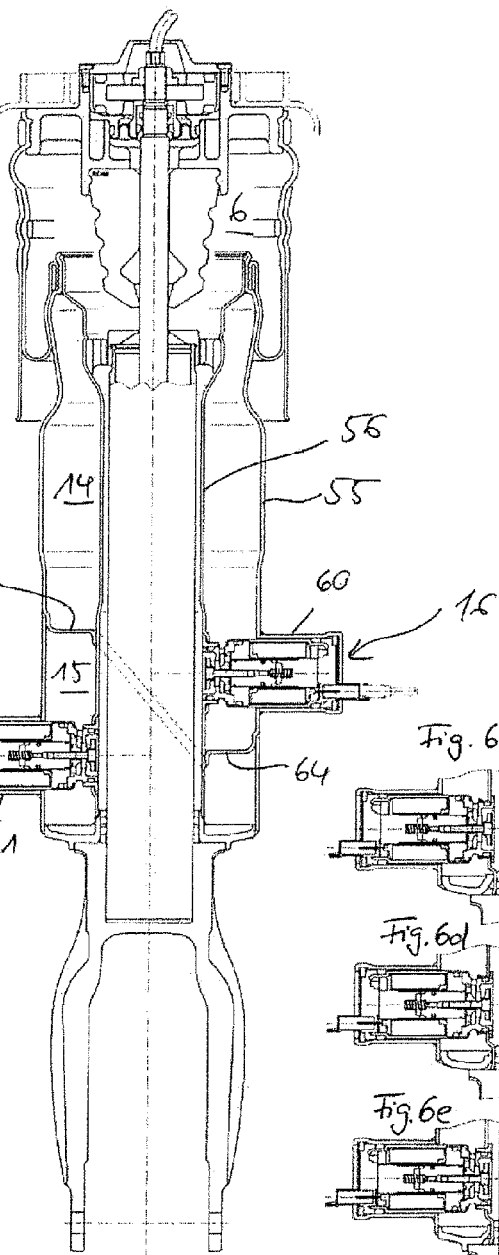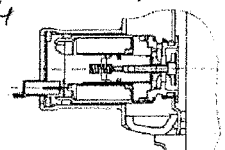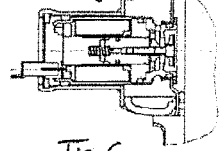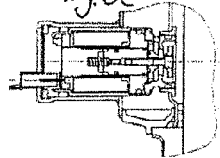

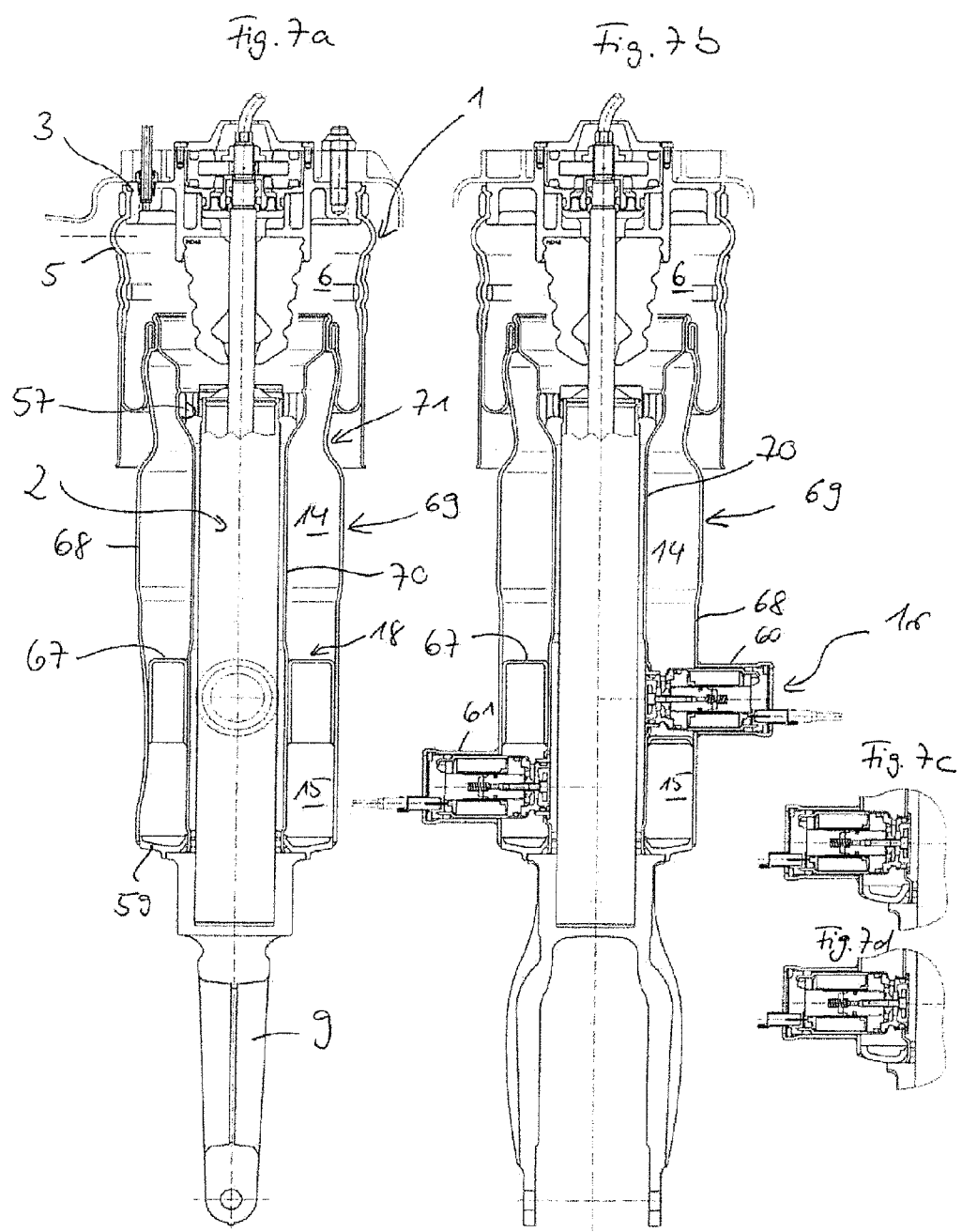

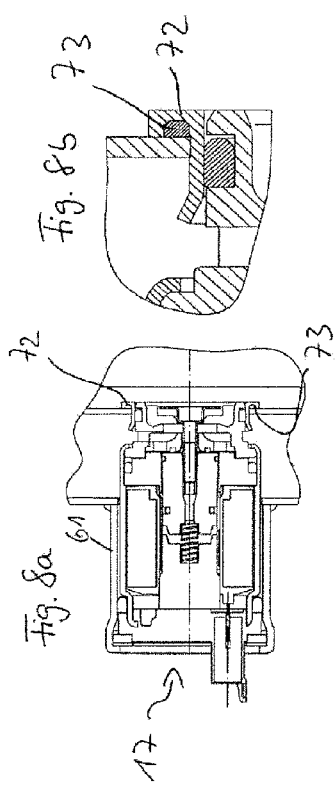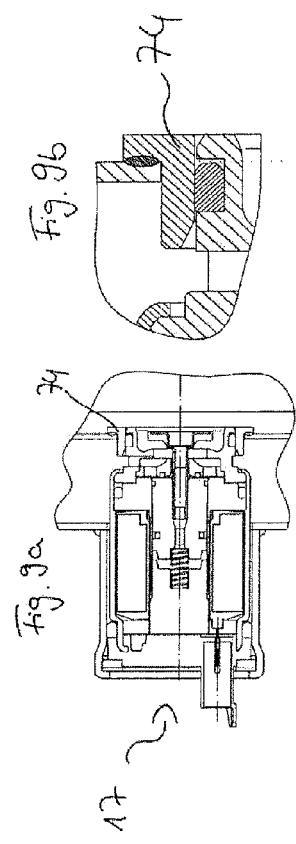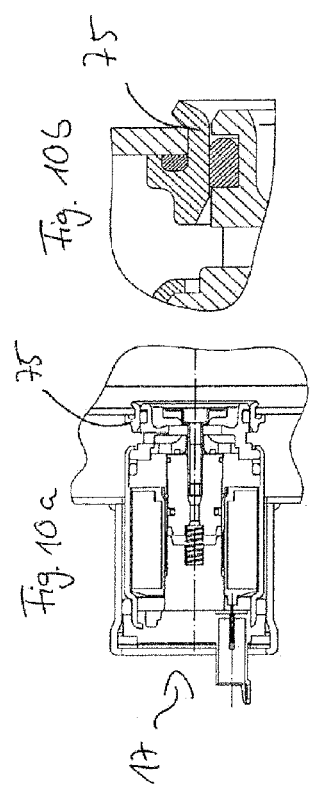

AIR SPRING MODULE

CROSS REFERENCE TO RELATED APPLICATIONS

This application is the U.S. National Phase Application of PCT/EP2013/064025, filed Jul. 3, 2013, which claims priority to German Patent Application No. 10 2012 016 397.5, filed Aug. 21, 2012 and German Patent Application No. 10 2012 217 538.5, filed Sep. 27, 2012, the contents of such applications being incorporated by reference herein.

FIELD OF THE INVENTION

The invention relates to an air spring module comprising an air spring and a shock damper for spring cushioning and damping vibrations of a motor vehicle running gear, having at least two working chambers, which are filled with compressed air and can be connected by means of at least one valve, an air spring cover, an airtight rolling bellows, which is fixed to the air spring cover and at least partly delimits a first working chamber filled with compressed air, a rolling piston, which is fixed to a cylinder tube of the shock damper and on which the rolling bellows rolls.

BACKGROUND OF THE INVENTION

In the case of fundamentally known air spring modules having a plurality of working chambers, each having a volume (volume $V_1$ to $V_i$), individual volumes (Vgesamt=$\Sigma Vi$) must be divided from the overall air spring volume by a partition wall and suitable switching valves.

Thus, an air spring having two working chambers can be found in DE 102 00 632 A1, which is incorporated by reference, for example, wherein the second working chamber is designed with an additional volume in the air spring cover, making it possible to switch between a sporty or a comfortable mode of the air spring module by connecting or disconnecting the additional volume.

In contrast, more recent air spring developments have three volumes, thus making it possible to select one or two intermediate modes between sport and comfort.

In the case of these three volumes, additional volumes 1 and 2 can be separated off, ensuring that only V0 (=air spring) exhibits a spring action. If valve 1 is opened, additional volume 1 is added and volumes V0+ZV1 are available. If, on the other hand, valve 2 is opened, volumes V0+ZV2 are available. If both valves are open, volumes V0+ZV1+ZV2 are available. Thus, the overall volumes V0, V0+ZV1, V0+ZV2 and V0+ZV1+ZV2 can be selected. Through appropriate selection of the size of the additional volumes, it is thus possible to implement very finely graduated volumes and thus also spring rates.

Here, the small volume V0 on its own gives a sporty and hard spring rate, while the large volume V0+ZV1+ZV2 gives a comfortable and soft spring rate.

The principle involving air spring volumes plus two additional volumes is already known. However, in that case the two additional volumes and valves are integrated into the cover. Particularly as regards available installation space, which is generally small, this embodiment has disadvantages. Moreover, it leads to high costs, production outlay and assembly effort.

SUMMARY OF THE INVENTION

An aspect of the invention provides an air spring module which is improved in this respect and has at least two working chambers and which can be produced and assembled at low cost and in a simple manner while, at the same time, taking up as little installation space as possible.

The air spring module according to an aspect of the invention is characterized in that a second and a third working chamber are arranged one above the other in the rolling piston so as to surround the cylinder tube, which working chambers are provided in such a way as to be separated from one another by an intermediate plate provided in the rolling piston and can be connected to the first working chamber by means of switchable valves arranged in the rolling piston.

The additional volumes of the second and third working chambers increase the axial installation space requirement of the air spring module either insignificantly or not at all in comparison with arrangement in the air spring cover. Production is furthermore simplified by the fact that the valves can be arranged directly on the rolling piston.

The rolling piston preferably has at least one outer tube having a clamping contour, on which outer tube the rolling bellows is fastened by means of a clamping element and on which the rolling bellows rolls, and an inner tube is provided, by means of which the rolling piston is positioned on the cylinder tube, wherein the inner tube and the outer tube are connected airtightly in the region of the clamping contour. In particular, this construction allows simple production of the rolling piston.

According to an advantageous embodiment of the invention, the rolling piston is of multipart design and has at least one piston part and one end plate. By means of the end plate, it is possible to eliminate tolerances of individual parts over the overall length, for example.

If, according to an advantageous embodiment, the intermediate plate is provided as a separate component, which is fastened airtightly in the piston part, the two components, the inner tube and the outer tube, can be formed integrally by the clamping contour as far as the end plate, thereby making it possible to simplify production and assembly.

Another advantageous embodiment of the invention envisages that the piston part of the rolling piston is of multipart design and has at least one piston top part and one piston bottom part, wherein the intermediate plate is provided in the piston top part or in the piston bottom part, which can be closed airtightly with the end plate. It is thereby possible, for example, to produce the two piston parts from different materials. At the same time, separate sealing of the intermediate plate is eliminated.

The rolling piston preferably has a tilt safeguard, which allows secured fastening on the cylinder tube and, at the same time, air exchange between the second and third working chambers and the first working chamber, thus allowing air exchange to be provided in a simple manner without further design developments.

According to an advantageous development of the invention, the tilt safeguard is made of plastic and is fixed without play in a bead on the inner tube, thereby enabling it to be produced and assembled in a simple and low-cost manner.

The valves can be assembled in a simple manner if, according to an advantageous embodiment of the invention, valve receptacles for the valves are provided in such a way as to be formed or fastened on the outer tube. A complete functional and production unit is formed.

As an advantageous option, the rolling piston can be made of steel and/or of aluminum, thereby enabling the components to be produced in a simple and low-cost manner.

A weight saving can be achieved if, according to an advantageous embodiment, the rolling piston is made of plastic.

If the rolling piston is made of plastic, it is possible for the piston top part and the piston bottom part to be welded to one another or connected airtightly to one another by means of a snap joint.

The tilt safeguard is preferably provided in such a way as to be formed integrally on the inner tube, therefore making it possible to eliminate mounting of this component.

BRIEF DESCRIPTION OF THE DRAWINGS

Further features, advantages and possible uses of the invention will be apparent from the dependent claims and the following description of illustrative embodiments and with reference to the drawing, in which, in each case in highly schematized form and partially in section:

FIG. 1a shows a first illustrative embodiment of an air spring module according to the invention in longitudinal section;

FIG. 1b shows the first illustrative embodiment according to FIG. 1a in longitudinal section, rotated through 90°;

FIG. 2a shows a second illustrative embodiment of an air spring module according to the invention in longitudinal section;

FIG. 2b shows the second illustrative embodiment according to FIG. 2a in longitudinal section, rotated through 90°;

FIG. 3a shows a third illustrative embodiment of an air spring module according to the invention in longitudinal section;

FIG. 3b shows the third illustrative embodiment according to FIG. 3a in longitudinal section, rotated through 90°;

FIG. 4a shows a fourth illustrative embodiment of an air spring module according to the invention in longitudinal section;

FIG. 4b shows the fourth illustrative embodiment according to FIG. 4a in longitudinal section, rotated through 90°;

FIG. 4c shows a detail of the fourth illustrative embodiment according to FIGS. 4a and 4b having an end-plate and valve-seat variant;

FIG. 4d shows a detail of the fourth illustrative embodiment according to FIGS. 4a and 4b having an end-plate and valve-seat variant;

FIG. 4e shows a detail of the fourth illustrative embodiment according to FIGS. 4a and 4b having an end-plate and valve-seat variant;

FIG. 5a shows a fifth illustrative embodiment of an air spring module according to the invention in longitudinal section;

FIG. 5b shows the fifth illustrative embodiment according to FIG. 5a in longitudinal section, rotated through 90°;

FIG. 5c shows a detail of the fifth illustrative embodiment according to FIGS. 5a and 5b having a valve variant;

FIG. 5d shows a detail of the fifth illustrative embodiment according to FIGS. 5a and 5b having a valve variant;

FIG. 6a shows a sixth illustrative embodiment of an air spring module according to the invention in longitudinal section;

FIG. 6b shows the sixth illustrative embodiment according to FIG. 6a in longitudinal section, rotated through 90°;

FIG. 6c shows a detail of the sixth illustrative embodiment according to FIGS. 6a and 6b having a valve variant;

FIG. 6d shows a detail of the sixth illustrative embodiment according to FIGS. 6a and 6b having a valve variant;

FIG. 6e shows a detail of the sixth illustrative embodiment according to FIGS. 6a and 6b having a valve variant;

FIG. 7a shows a seventh illustrative embodiment of an air spring module according to the invention in longitudinal section;

FIG. 7b shows the seventh illustrative embodiment according to FIG. 7a in longitudinal section, rotated through 90°;

FIG. 7c shows a detail of the seventh illustrative embodiment according to FIGS. 7a and 7b having a valve variant;

FIG. 7d shows a detail of the seventh illustrative embodiment according to FIGS. 7a and 7b having a valve variant;

FIG. 8a shows a detail of an eighth illustrative embodiment of an air spring module according to the invention;

FIG. 8b shows an enlarged detail of the eighth illustrative embodiment according to FIG. 8a;

FIG. 9a shows a detail of a ninth illustrative embodiment of an air spring module according to the invention;

FIG. 9b shows an enlarged detail of the ninth illustrative embodiment according to FIG. 9a;

FIG. 10a shows a detail of an eighth illustrative embodiment of an air spring module according to the invention; and FIG. 10b shows an enlarged detail of the eighth illustrative embodiment according to FIG. 10a.

DETAILED DESCRIPTION OF THE PREFERRED EMBODIMENTS

FIG. 1a shows a detail of a first illustrative embodiment of an air spring module, which, as is known, comprises an air spring 1 and a shock damper 2 for spring cushioning and damping vibrations of a motor vehicle running gear, which can preferably be fastened in a fixed manner on the body at a first end and on a wheel suspension at a second end in the motor vehicle. The air spring 1 comprises an air spring cover 3, which is fixed to the body, a first end of a rolling bellows 5, said first end being fastened thereon in an airtight manner by means of a clamping element 4, which rolling bellows at least partially delimits a first working or pressure chamber 6 filled with compressed air. A second end of the rolling bellows 5 is connected airtightly to a rolling piston 7. The rolling piston 7, on which the rolling bellows 5 can roll, is connected to a cylinder tube 8 of the shock damper 2, wherein a damper fork 9, which can be fastened on the wheel suspension, is preferably fastened to the cylinder tube 8. At an end face, a second end of the cylinder tube has a hole for a piston rod 10 of the shock damper 2, wherein, when the air spring module is almost completely compressed, the end face of the cylinder tube 8 is supported on an additional spring 11, which is arranged concentrically with a piston rod 10 of the shock damper 2. The additional spring 11 is guided in a guide ring 12, which is firmly connected to the air spring cover 3.

A damper bearing 13, which is arranged in the air spring cover 3 and connects the piston rod 10 of the shock damper 2 to the air spring cover 3, has the task of filtering out high frequency excitation—caused by the road surface—and thus bypassing the system-inherent inertia of the shock damper 2, which would have a negative effect on ride comfort.

In order to be able to switch between various modes of the air spring module, the air spring has two further working chambers 14, 15, the additional volume (ZV) of which can be connected to the first working chamber 6 by means of switchable valves 16, 17, which are illustrated in FIG. 1b—a section through FIG. 1a rotated through 90°.

In the case of these three volumes, additional volumes 1 and 2 can be partitioned off, ensuring that only V0, i.e. the volume of the first working chamber 6, exhibits a spring action. If valve 16 is opened, the additional volume 1 of the second working chamber 14 is added and volumes V0+ZV1 are available. If, on the other hand, valve 17 is opened, the additional volume 2 of the second working chamber 15 is added and volumes V0+ZV2 are available. If both valves 16, 17 are opened, volumes V0+ZV1+ZV2 are available. Thus, the overall volumes V0, V0+ZV1, V0+ZV2 and V0+ZV1+ZV2 can be selected. Through appropriate selection of the size of the additional volumes, it is thus possible to implement very finely graduated volumes and thus also spring rates.

Here, the small volume V0 on its own gives a sporty and hard spring rate, while the large volume V0+ZV1+ZV2 gives a comfortable and soft spring rate.

The second and third working chambers 14, 15 are arranged one above the other in the rolling piston 7 so as to surround the cylinder tube 8 and are separated from one another by an intermediate plate 18 provided in the rolling piston 7. As is apparent, these two additional working chambers 14, 15 increase the axial installation space requirement of the air spring module either insignificantly or not at all in comparison with arrangement in the air spring cover 3, and the valves 16, 17 can be arranged in a simple manner directly on the rolling piston 7.

The rolling piston 7 has an outer tube 19 having a clamping contour, on which outer tube the rolling bellows 5 is fastened by means of a clamping element 21 and on which the rolling bellows 5 rolls. An inner tube 20, by means of which the rolling piston 7 is positioned on the cylinder tube 8, is connected airtightly to the outer tube 19 in the region of the clamping contour. The connection is made by means of a roller seam weld, for example, which can be produced simultaneously with the rolling of the clamping profile.

As will be apparent from FIGS. 1a and 1b, the rolling piston 7 is of multipart design and has at least one piston part, which in this illustrative embodiment is itself of multipart construction comprising a piston top part 22 and a piston bottom part 23, and an end plate 24. The end plate 24 closes the piston bottom part 23, in which the intermediate plate 18 is provided. By means of the end plate 24, it is possible to eliminate tolerances of individual parts over the overall length.

A tilt safeguard 25 made of plastic is fixed without play in a bead 26 running continuously or dis-continuously around the inner tube 20 and allows secured fastening of the rolling piston 7 on the cylinder tube 8 and, at the same time, air exchange between the second and third working chambers 14, 15 and the first working chamber 6 in a simple manner without the need to provide complex design measures for air exchange.

The inner and outer tubes 19, 20 are produced by rolling aluminum or steel sheet, for example. The piston bottom part 23, on the other hand, is preferably made from diecast aluminum, although thin-walled cast steel is also conceivable. This has the advantage that the intermediate plate 18 is integrated between the two working chambers 14, 15 and is leaktight. Valve seats 27, 28 and valve receptacles 29, 30 are likewise integrated directly into the piston bottom part 23, with the result that said bottom part forms a complete functional and production unit. Moreover, any desired indentations 31 and bulges 32 (shown in FIG. 4a) can be accommodated in the piston bottom part 23. This ensures that sufficient clearance with respect to adjacent components is always maintained, even in restricted installation spaces and in unfavorable kinematic positions.

The piston top part 22 is mounted on the piston bottom part 23 in such a way that both parts can be welded airtightly, e.g. by friction stir welding. In principle, however, any other welding method is also possible. The inner tube 20, on the other hand, is only inserted into the piston bottom part 23, where it is sealed using a seal 33, preferably using an O-ring.

After the installation of the end plate 24, the piston bottom part 23 and the end plate 24 are welded on the outside, preferably by friction stir welding, and on the inside by fusion welding.

In this way, a stable rolling piston 7 with a flexible volume and a flexibly adaptable clearance with respect to adjacent components is produced, which can furthermore be manufactured economically.

In the form shown, the end plate 24 is straight and the valves 16, 17 are positioned in such a way that they each provide access to one of the two additional volumes 14, 15. However, it is also possible to configure the end plate 24 in any desired way and thus to adapt the volume proportions flexibly to the respective requirements.

The illustrative embodiments described below correspond in the fundamental construction thereof to the first illustrative embodiment, and therefore it is in each case only the differences with respect to the other illustrative embodiments which will be explored below.

In contrast to the first illustrative embodiment, the second illustrative embodiment according to FIGS. 2a and 2b has a rolling piston 34 with a piston top part 35 and a piston bottom part 36 made of plastic. A separate tilt safeguard is omitted since it is integrated into an inner tube 37 of the piston top part 35. All the parts are therefore injection molded plastic parts which are simple and economical to produce.

If the required spring stiffness necessitates a large piston angle or if a large number of vehicle variants with differing weights have to be covered, the rolling piston 34 can additionally be provided with a piston skirt 38. In this case, an outer tube 39 remains the same for all variants, and only the piston skirt 38 is exchanged. The parts can be manufactured in a correspondingly economical and flexible manner.

The outer tube 39 is configured in such a way that there are no undercuts. The mold and the manufacturing process therefore become simple and economical. The same applies to the inner tube 37. More economical manufacture is possible, despite the integration of the tilt safeguard. The outer and inner tubes 37, 39 are welded airtightly in the region of the clamping contour, and a plurality of suitable welding methods is available.

Piston bottom part 36 does not differ substantially from the piston bottom part 23 of the first illustrative embodiment but has greater wall thicknesses. This is due to the lower strength of plastic as compared with diecast aluminum materials.

The transition to the outer tube 39 is designed as a ring-type snap joint. The joint with respect to the inner tube 37 is without undercuts and can thus be manufactured with simple, reliable molds. The same applies to the valve receptacles 40, 41 and valve holders 42, 43, which are defined without undercuts by means of plastic screws.

An end plate 44 is designed in such a way that—after the insertion of seals 45—preferably O-rings—the piston bottom part 36 can be pushed over in a simple manner. In operation, the only forces act downward, and therefore both parts are always pressed together.

The ring-type snap joint is formed on the piston bottom part 36 in such a way that, on the one hand, it prevents falling apart in the unpressurized state and, on the other hand, ensures that a seal 46—preferably an O-ring—is seated in an optimum manner and cannot be damaged when the two parts are joined together.

Once again, it should be emphasized here too that the indentation 31 in the piston bottom part 36 for clearances with respect to adjacent components can be integrated in a simple and economical manner.

The third embodiment according to FIGS. 3*a* and 3*b* likewise has a rolling piston 47 made of plastic. It differs from the second embodiment only in that an outer and an inner tube 48, 49 of a piston top part 50 are formed integrally. The welded joint between the inner and outer tubes 48, 49 is thus omitted, thereby increasing leaktightness/reliability of sealing between the inner and outer tubes 48, 49.

Instead of the ring-type snap joint described with reference to FIG. 2*a* and the seal 46 between the outer tube 49 and the piston bottom part 51, the piston top part 50 is welded airtightly to the piston bottom part 51 by means of a welded plastic joint, although the detailed design of the weld seam is not shown.

An end plate 52 is likewise made of plastic and is connected airtightly to the piston bottom part 51 by a plastic weld. The advantage is higher stiffness of the rolling piston 47 and simpler installation of the rolling piston 47 in the air spring module.

A fourth illustrative embodiment is shown in FIGS. 4*a* and 4*b*. It shows a rolling piston 53 made of aluminum sheet or steel sheet.

The rolling piston 53 comprises a piston top part 54 having outer and inner tubes 55, 56, a tilt safeguard 57, a piston bottom part 59, an end plate 59 and valve receptacles 60, 61. All the parts are welded airtightly to one another, and different welding methods can be used.

The only exception is the plastic tilt safeguard 57, which—as in FIG. 1*a*—is fixed in the inner tube 56 by a bead.

In this illustrative embodiment, the inner tube 56 extends downward over the entire length of the piston. In the clamping region, it is connected airtightly—preferably by pressure welding—to the outer tube 55. In the region of valve seats 62, 63, it is widened and, directly in front of the end plate 59, is constricted again—ensuring that it matches seals (not shown) in an optimum manner—and the end is widened slightly in a conical shape, allowing it to be pushed over the seals without damaging them. In addition, the inner tube 56 has respective flat stamped features, which are perforated, directly at the valve seats 62, 63.

The outer tube 55 is drawn deeply downward. Directly below the upper valve 16, it is drawn inward and provided with a collar 64. It thus forms the intermediate plate 18 which separates the working chambers 14, 15. At the collar 64, the outer tube 55 is welded airtightly around the inner tube 56 and thus forms the second working chamber 14 (=additional volume 1). Because the inner tube 56 has the flat stamped feature described in the region of the collar 64, the collar 64 is also shaped to match in a corresponding way, with the result that both parts fit together accurately and a uniform gap which can be reliably closed by the welding is formed.

At the transition from the outer tube 55 to the end plate 59, the outer tube 55 is drawn in slightly in diameter. This serves for the centering of the piston bottom part 58, as described below. It also has indentations 31, which ensure that there is sufficient clearance with respect to adjacent components in the vehicle. And in the region of the upper valve 16—like the inner tube 56—it has a flat stamped feature, which is perforated. The valve receptacle 60 is then welded onto this stamped feature.

In this illustrative embodiment, the piston bottom part 58 is a tube which serves as an extension of the outer tube 55 of the piston top part 53 and thus forms the third working chamber 15. It is shaped in such a way that it continues the indentations 31 of the outer tube 55 and thus likewise has sufficient clearance with respect to adjacent components of the vehicle. In the region of the lower valve 17 it likewise has a flat stamped feature, which is likewise perforated. Here too, the valve receptacle 61 is welded on.

In accordance with the required volume, the piston bottom part 58 furthermore has outward bulges 32 of any desired shape. These enlarge the volume precisely in the regions in which there is sufficient space in the vehicle.

The end plate 59 serves as the lower termination of the rolling piston 53 and for force introduction into the damper fork 9. In principle, there are various possibilities for embodiment here, these being illustrated in FIGS. 4*c*, 4*d* and 4*e*, although other embodiments are also conceivable. The two embodiments of the end plate 59 according to FIGS. 4*b* and 4*e* can be produced simply and economically as diecastings and each have an integrated centering means with respect to the damper fork 9. In contrast, the embodiments shown in FIGS. 4*c* and 4*d* are embodied as deep drawn or pressed components, this generally being more economical, although at the cost of the absent centering means.

The valve receptacles 60, 61 are shaped from tubular material or deep drawn from blanks, and one end is punched out, thereby allowing economical manufacture. They are welded onto the stamped features of the outer tube 55 by means of airtight welding.

The valve seats 63 in FIGS. 4*b* to 4*e* differ. The embodiment illustrated in FIGS. 4*b* and 4*e* can be produced economically in different ways, namely from a tube by forming a collar thereon, for example. However, production by cold extrusion or deep drawing is also possible. They are pushed through holes in the inner tube 56 from the inside and can be connected airtightly to the inner tube 56 by means of pressure welding.

The embodiments shown in FIGS. 4*a* to 4*e* are configured in such a way that all the parts can be produced economically. There is furthermore the advantage that all the parts can be assembled quickly, simply and reliably and thus economically—despite the complexity of the overall system. To achieve this, the tilt safeguard 57 is first of all rolled or crimped into the inner tube 56. The inner and outer tubes 55, 56 are then joined together by rolling in the clamping region, the airtight weld also being produced at the same time. The collar 64 of the outer tube 55 is then welded airtightly to the inner tube 55 at the bottom, thus forming the additional volume 1 (working chamber 14). The end plate 59 can now be welded to the inner tube 56 and the conical inner tube end formed. The piston bottom part 58 is then pushed over in such a way that it rests against the outer tube 55 and the end plate 59. Both ends are welded, whereby the additional volume 2 (working chamber 15) is also formed.

The valve seats 62, 63 can then be pushed in through the inner tube 56 from below and connected airtightly by means of pressure welding. Finally, the valve receptacles 60, 61 are aligned radially with the valve seats 62, 63 and are likewise welded on airtightly. A stable piston system has thus been produced by simple, economical assembly steps.

A slightly different assembly sequence is likewise possible and economical.

The variants of the valve seats 62, 63 differ only slightly in the sequence of assembly. In the case of FIGS. 4c and 4d, the valve seats 63 are not pressure welded but are caulked in such a way that the inner tube material flows into the center of the hole and thus firmly clamps the valve seats 63. Sealing is then performed by an inserted seal 65, preferably an O-ring.

The connection of the end plate 59 to the inner tube 56 according to FIGS. 4b and 4c is preferably accomplished by welding from the outside. However, it is also possible to weld from the inside, in which case the piston bottom part 56 can then only be installed afterward. In the case of FIG. 4e, welding from the inside is envisaged from the outset. In the case of FIG. 4d, external welding is also possible as an alternative.

The fifth illustrative embodiment according to FIGS. 5a to 5d differs from the previous embodiments in that the outer tube 55 is not drawn inward at the transition to the piston bottom part 58. Instead, the piston bottom part 58 is provided with a collar 66 at the top. As a consequence, it is also not possible to weld on the end plate 59 first and then to push the piston bottom part 58 over the top. This possible assembly sequence is eliminated. This embodiment too allows the individual parts to be produced and assembled economically.

In the case of the illustrative embodiments according to FIGS. 4a to e and FIGS. 5a to d, the piston bottom part 58 has in each case been made to bulge outward in such a way that the additional volume 2 of working chamber 15 could become sufficiently large. For this purpose, the collar 64 of the outer tube 56 was straight, meaning that manufacturer is simplified in the case of this component.

In the case of the sixth illustrative embodiment according to FIGS. 6a to e, the collar 64 on the outer tube 55 is of stepped or oblique design, as is apparent especially from FIG. 6b.

This makes the additional volume 2 larger, and it is possible—though not necessary—to dispense with the stamping of the bulge 32 on the piston bottom part 58. This is advantageous especially if there is no room in the vehicle for a volume-enlarging bulge.

In other respects, design and assembly correspond to the two illustrative embodiments described above with their specific economic and technical advantages.

The variants of the seventh illustrative embodiment according to FIGS. 7a to 7d also largely correspond to illustrative embodiments four to six. The difference is, in particular, that the intermediate plate 18, which was previously formed by the outer tube 55, is now formed by a separate component 67. This makes it possible to make an outer tube 68 of a piston part 69 in one piece from the clamping region at the top to the end plate 59 at the bottom. Forces then do not need to be transmitted via the weld seam, and a sealing location with respect to the outside is eliminated, benefiting functional reliability. An inner tube 70 remains largely the same in comparison with the illustrative embodiments mentioned.

Because the intermediate plate 18 can be formed as a separate component 67 by a relatively simple deep drawn part, it can be used to provide more flexible adaptation of the additional volume 2 of working chamber 15, since formation toward the top or toward the bottom is selected, depending on requirements. Assembly is then very simple since, once the outer and inner tubes 68, 70 have been welded to one another airtightly at the top, all that is required is to push the intermediate plate 18 in at the bottom and weld it airtightly to the inner and outer tubes 68, 70. The further assembly steps can then take place as in the previous illustrative embodiments. A robust, leaktight and functionally reliable rolling piston 71, which can furthermore be produced very economically, is formed.

The illustrative embodiments described below describe different valve seat variants. In principle, these can be inserted in all the illustrative embodiments described above.

FIGS. 8a and 8b show a detail of an eighth illustrative embodiment. As can be seen, a valve seat 72 is caulked in such a way that the inner tube material flows into the center of the hole and thus firmly clamps the valve seat. Sealing is then accomplished by an inserted seal 73, preferably an O-ring.

In contrast, a valve seat 74 of a ninth illustrative embodiment is produced from a tube by forming a collar thereon. However, the possible production methods for the valve seat 74 also include cold extrusion or deep drawing. The valve seats 74 are pushed through the holes in the respective inner tube from the inside and can be connected airtightly to the inner tube by means of pressure welding.

In contrast to valve seats 72 and 74, a valve seat 75 of a tenth illustrative embodiment can be inserted from the outside and fixed securely by bending over the inner edge. As a result, this valve seat 75 is particularly suitable for softer materials, such as aluminum alloys.

LIST OF REFERENCE SIGNS 1 air spring
2 shock damper
3 air spring cover
4 clamping element
5 rolling bellows
6 working chamber
7 rolling piston
8 cylinder tube
9 damper fork
10 piston rod
11 additional spring
12 guide ring
13 damper bearing
14 working chamber
15 working chamber
16 valve
17 valve
18 intermediate plate
19 outer tube
20 inner tube
21 clamping element
22 piston top part
23 piston bottom part
24 end plate
25 tilt safeguard
26 bead
27 valve seat
28 valve seat
29 valve receptacle
30 valve receptacle
31 indentation
32 bulge
33 seal
34 rolling piston
35 piston top part
36 piston bottom part
37 inner tube
38 piston skirt
39 outer tube 40 valve receptacle
41 valve receptacle
42 valve holder
43 valve holder
44 end plate
45 seal
46 seal
47 rolling piston
48 inner tube
49 outer tube
50 piston top part
51 piston bottom part
52 end plate
53 rolling piston
54 piston top part
55 outer tube
56 inner tube
57 tilt safeguard
58 piston bottom part
59 end plate
60 valve receptacle
61 valve receptacle
62 valve seat
63 valve seat
64 intermediate plate
65 seal
66 collar
67 component
68 outer tube
69 piston part
70 inner tube
71 rolling piston
72 valve seat
73 seal
74 valve seat
75 valve seat

The invention claimed is:

1. An air spring module comprising an air spring and a shock damper for spring cushioning and damping vibrations of a motor vehicle running gear, having
 a plurality of working chambers comprising a first working chamber, a second working chamber, and a third working chamber, each of the plurality of working chambers being filled with compressed air,
 an air spring cover,
 an airtight rolling bellows, which is fixed to the air spring cover and at least partly delimits the first working chamber filled with the compressed air,
 a rolling piston, which is fixed to a cylinder tube of the shock damper and on which the rolling bellows rolls, and
 a piston rod extending from the cylinder tube toward the air spring cover,
 wherein the second working chamber and the third working chamber are arranged one above the other in the rolling piston so as to surround the cylinder tube such that a radially inner wall of the second and third working chambers is positioned radially outward of a radially outer wall of the cylinder tube, the second and third working chambers provided in such a way as to be separated from one another by an intermediate plate provided in the rolling piston, the second and third working chambers configured to be connected to the first working chamber through valves arranged in the rolling piston.

2. The air spring module as claimed in claim 1, wherein the rolling piston has at least one outer tube having a clamping contour, wherein the rolling bellows is fastened on the at least one outer tube by a clamping element and wherein the rolling bellows rolls on the at least one outer tube, and an inner tube is provided, by which the rolling piston is positioned on the cylinder tube, wherein the inner tube and the outer tube are connected airtightly in the region of the clamping contour.

3. The air spring module as claimed in claim 1, wherein the rolling piston is of multipart design and has at least one piston part and one end plate.

4. The air spring module as claimed in claim 3, wherein the intermediate plate is provided as a component separate from the rolling piston, which is fastened airtightly in the piston part.

5. The air spring module as claimed in claim 3, wherein the piston part of the rolling piston is of multipart design and has at least one piston top part and one piston bottom part, wherein the intermediate plate is provided in the piston top part or in the piston bottom part, which can be closed airtightly with the end plate.

6. The air spring module as claimed in claim 1, wherein the rolling piston has a tilt safeguard, which allows secured fastening on the cylinder tube and, at the same time, air exchange between the second and third working chambers and the first working chamber.

7. The air spring module as claimed in claim 6, wherein the tilt safeguard is made of plastic and is fixed without play in a bead on the inner tube.

8. The air spring module as claimed in claim 4, wherein valve receptacles for the valves are provided in such a way as to be formed or fastened on the outer tube.

9. The air spring module as claimed in claim 1, wherein the rolling piston is made of steel and/or of aluminum.

10. The air spring module as claimed in claim 7, wherein the rolling piston is made of plastic.

11. The air spring module as claimed in claim 9, wherein a piston top part and a piston bottom part are welded to one another or connected airtightly to one another by a snap joint.

12. The air spring module as claimed in claim 10, wherein the tilt safeguard is provided in such a way as to be formed integrally on the inner tube.

* * * * *